United States Patent
Park et al.

(10) Patent No.: US 12,136,733 B2
(45) Date of Patent: Nov. 5, 2024

(54) CATHODE ACTIVE MATERIAL AND LITHIUM SECONDARY BATTERY INCLUDING THE SAME

(71) Applicant: SK INNOVATION CO., LTD., Seoul (KR)

(72) Inventors: Sung Soon Park, Daejeon (KR); Ji Hoon Choi, Daejeon (KR); Jik Soo Kim, Daejeon (KR); Kwang Ho Lee, Daejeon (KR); Jeong Hoon Jeun, Daejeon (KR)

(73) Assignee: SK ON CO., LTD., Seoul (KR)

( * ) Notice: Subject to any disclaimer, the term of this patent is extended or adjusted under 35 U.S.C. 154(b) by 131 days.

(21) Appl. No.: 17/508,435

(22) Filed: Oct. 22, 2021

(65) Prior Publication Data

US 2022/0131145 A1 Apr. 28, 2022

(30) Foreign Application Priority Data

Oct. 22, 2020 (KR) .................. 10-2020-0137626

(51) Int. Cl.
*H01M 4/525* (2010.01)
*H01M 4/02* (2006.01)
*H01M 4/36* (2006.01)
*H01M 10/0525* (2010.01)

(52) U.S. Cl.
CPC .......... *H01M 4/525* (2013.01); *H01M 4/362* (2013.01); *H01M 10/0525* (2013.01); *H01M 2004/021* (2013.01); *H01M 2250/30* (2013.01)

(58) Field of Classification Search
CPC ...................... H01M 2004/025–028
See application file for complete search history.

(56) References Cited

U.S. PATENT DOCUMENTS

| | | | |
|---|---|---|---|
| 6,306,787 B1 * | 10/2001 | Sato .............. | H01M 4/525 423/594.3 |
| 2007/0099087 A1 * | 5/2007 | Mihara .......... | C01G 45/1242 429/231.95 |

(Continued)

FOREIGN PATENT DOCUMENTS

| CN | 108352527 A | 7/2018 |
|---|---|---|
| EP | 1044927 A1 | 10/2000 |

(Continued)

OTHER PUBLICATIONS

Yin Ding et al., A short review on layered LINi0.8Co0.1Mn0.1O2positive electrode material for lithium-ion batteries, Energy Procedia, 2017, vol. 105, p. 2941-2952.

(Continued)

*Primary Examiner* — Haroon S. Sheikh
*Assistant Examiner* — Aryana Y. Ortiz
(74) *Attorney, Agent, or Firm* — IP & T GROUP LLP (57) ABSTRACT

The cathode active material according to embodiments of the present invention includes a lithium composite oxide particle having a form of secondary particle in which a plurality of primary particle are aggregated, wherein the primary particles respectively include a lithium conduction pathway through which lithium ions are diffused. Wherein the primary particles include a first particle, and the first particle has an angle of 45° to 90° formed by a direction from a center of the first particle to a center of the lithium composite oxide particle and a direction of the lithium conduction pathway included in the first particle, wherein a ratio of the number of the first particles among the primary particles located on a surface of the lithium composite oxide particle is 20% or more.

6 Claims, 8 Drawing Sheets

(56) References Cited

U.S. PATENT DOCUMENTS

| | | | | |
|---|---|---|---|---|
| 2012/0258365 | A1* | 10/2012 | Yokoyama | C01G 51/42 429/223 |
| 2018/0040896 | A1* | 2/2018 | Choi | H01M 4/0402 |
| 2022/0166016 | A1* | 5/2022 | Sun | H01M 10/0525 |

FOREIGN PATENT DOCUMENTS

| | | | | |
|---|---|---|---|---|
| EP | 3255709 | A1 | 12/2017 | |
| EP | 3255709 | A4 * | 9/2018 | C01D 1/02 |
| KR | 10-0821523 | B1 | 4/2008 | |
| WO | WO-2020153833 | A1 * | 7/2020 | C01G 53/42 |

OTHER PUBLICATIONS

Tao Li et al., A short process for the efficient utilization of transition-metal chlorides in lithium-ion batteries: A case of Ni0.8Co0.1Mn0.1O1.1 and LiNi0.8Co0.1Mn0.1O2, Journal of Power Sources, 2017, vol. 342, p. 495-503.

Yujing Bi et al., Correlation of oxygen non-stoichiometry to the instabilities and electrochemical performance of LiNi0.8Co0.1Mn0.1O2 utilized in lithium ion battery, Journal of Power Sources, 2015, vol. 283, p. 211-218.

Xiang-Qun Li et al., Effect of sintering temperature on cycling performance and rate performance of LiNi0.8Co0.1Mn0.1O2, Transactions of Nonferrous Metals Society of China, 2014, vol. 24, p. 4023-4029.

Extended European Search Report issued by the European Patent Office on Apr. 7, 2022.

Office Action for the Chinese Patent Application No. 202111221080.X issued by the Chinese Patent Office on Oct. 28, 2023.

Office Action for the Chinese Patent Application No. 202111221080.X issued by the Chinese Patent Office on May 12, 2024.

* cited by examiner

CATHODE ACTIVE MATERIAL AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2020-0137626 filed on Oct. 22, 2020 in the Korean Intellectual Property Office (KIPO), the entire disclosure of which is incorporated by reference herein.

BACKGROUND OF THE INVENTION

1. Field of the Invention

The present invention relates to a cathode active material and a lithium secondary battery including the same, and more specifically, to a cathode active material including a plurality of metal elements and a lithium secondary battery including the cathode active material.

2. Description of the Related Art

A secondary battery is a battery which can be repeatedly charged and discharged, and has been widely applied to portable electronic devices such as a mobile phone, a laptop computer, etc. as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

A cathode of the lithium secondary battery includes a cathode active material capable of reversibly intercalating and deintercalating lithium ions. As the cathode active material, for example, lithium composite oxides may be employed.

The lithium composite oxide may include, for example, metal elements such as nickel, cobalt, manganese, aluminum and the like.

As a field, to which the lithium secondary battery is applied, is expanded to large devices such as a hybrid vehicle, etc., research and development for a high nickel lithium composite oxide having an increased nickel content to secure a high capacity of lithium secondary batteries have been actively conducted.

For example, Korean Patent Registration Publication No. 10-0821523 discloses a method of manufacturing a cathode active material including a high nickel-based lithium composite oxide.

PRIOR ART DOCUMENT

Patent Document

Korean Patent Registration Publication No. 10-0821523

SUMMARY OF THE INVENTION

An object of the present invention is to provide a cathode active material for a lithium secondary battery having improved mechanical and chemical stabilities.

Another object of the present invention is to provide a lithium secondary battery including the cathode active material having improved mechanical and chemical stabilities.

To achieve the above objects, according to an aspect of the present invention, there is provided a cathode active material including: a lithium composite oxide particle having a form of secondary particle in which a plurality of primary particles are aggregated, wherein the primary particles respectively include a lithium conduction pathway through which lithium ions are diffused, wherein the primary particles include a first particle, and the first particle has an angle of 45° to 90° formed by a direction from a center of the first particle to a center of the lithium composite oxide particle and a direction of the lithium conduction pathway included in the first particle, wherein a ratio of the number of the first particles among the primary particles located on a surface of the lithium composite oxide particle is 20% or more.

In one embodiment of the present invention, the primary particle may have a hexagonal crystal structure.

In some embodiment, the lithium conduction pathway may be formed in an ab-axis direction of the hexagonal crystal structure.

In one embodiment of the present invention, the first particle may include a particle having a triangular shape.

In one embodiment of the present invention, the primary particles may further include a second particle, and the second particle may have an angle of less than 45° formed by a direction from a center of the second particle to a center of the lithium composite oxide particle and a direction of the lithium conduction pathway included in the second particle.

In one embodiment of the present invention, the lithium composite oxide particle may have a specific surface area of 0.25 m²/g or less.

In one embodiment of the present invention, a mole fraction of nickel among elements except for lithium and oxygen of the lithium composite oxide particles may be 0.6 or more.

In one embodiment of the present invention, the lithium composite oxide particle may have a strength of 120 Mpa or more.

According to an aspect of the present invention, there is provided a lithium secondary battery including: a cathode comprising the above-described cathode active material, an anode, and a separation membrane interposed between the cathode and the anode.

The cathode active material of the present invention includes the lithium composite oxide particle in the form of a secondary particle in which a plurality of primary particles are aggregated, wherein the primary particles respectively include a lithium conduction pathway through which lithium ions are diffused, and the primary particles include the first particle, wherein the first particle may have an angle of 45° to 90° formed by a direction from a center of the first particle to a center of the lithium composite oxide particle and a direction of the lithium conduction pathway included in the first particle.

In the lithium composite oxide particle, a penetration depth of an electrolyte absorbed into the center of the lithium composite oxide particle may be decreased to suppress a side reaction with the electrolyte. Accordingly, an amount of gas generated by the side reaction between the lithium composite oxide particle and the electrolyte may be reduced.

In addition, since the lithium composite oxide particle may have a small specific surface area, a surface in contact with the electrolyte may be decreased to suppress a side reaction with the electrolyte. Accordingly, an amount of gas generated by the side reaction between the lithium composite oxide and the electrolyte may be more reduced.

The lithium composite oxide particle may have improved strength. Accordingly, the cathode including the same may have further improved mechanical safety.

The lithium composite oxide may have a small amount of residual lithium (e.g., $Li_2CO_3$, LiOH, etc.). Accordingly, the water washing process may be omitted during the manufacturing process, thus being advantageous.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

As used herein, the term "primary particle" may refer to a single particle (monolith) which exists alone without forming an aggregate.

As used herein, the term "secondary particle" may refer to a particle having a structure in which the primary particles are aggregated.

For example, the primary particle and the secondary particle may be classified based on a scanning electron microscope (SEM) image.

A cathode active material of the present invention includes a lithium composite oxide particle in a form of secondary particle in which a plurality of primary particles are aggregated, wherein the primary particles respectively may include a lithium conduction pathway (lithium pathway) through which lithium ions are diffused, wherein the primary particles may include a first particle, and the first particle may have an angle of 45° to 90° formed by a direction from a center of the first particle to a center of the lithium composite oxide particle and a direction of the lithium conduction pathway included in the first particle, and wherein a ratio of the number of the first particles among the primary particles located on a surface of the lithium composite oxide particle may be 20% or more.

The cathode active material of the present invention may effectively suppress a side reaction with the electrolyte, such that an amount of gas generated by the side reaction between the cathode active material and the electrolyte can be significantly reduced.

In addition, the cathode active material of the present invention may have improved particle strength, thus to implement a cathode having improved mechanical stability.

Further, since the cathode active material of the present invention has a small amount of surface residual lithium, a water washing process may be omitted during manufacturing, and the process may be more simplified.

Hereinafter, exemplary embodiments of the present invention will be described in detail with reference to the accompanying drawings. However, these embodiments are merely an example, and the present invention is not limited to the specific embodiments described as the example.

Figure 1:
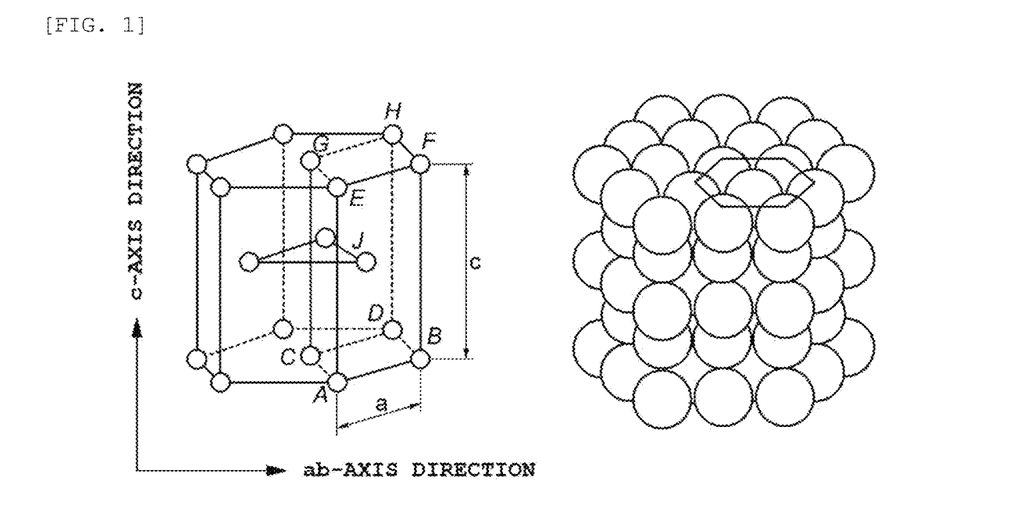
FIGS. 1 and 2 are schematic views for describing a crystal structure of primary particle and lithium conduction pathway (lithium pathway)
Figure 2:
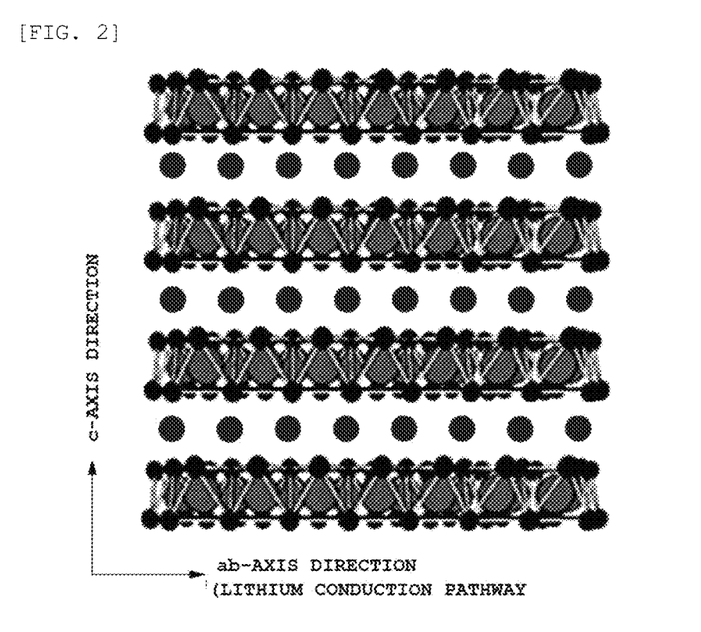

FIGS. 1 and 2 are schematic views for describing a crystal structure of primary particles and lithium conduction pathways according to an embodiment of the present invention.

The cathode active material of the present invention may include a plurality of primary particles which respectively include a lithium conduction pathway through which lithium ions are diffused.

The cathode active material may include, for example, a lithium composite oxide particle in a form of a secondary particle in which the primary particles are aggregated.

For example, the primary particle may have a hexagonal crystal structure. Referring to FIG. 1, the hexagonal crystal structure may mean a shape such as a prism having a regular hexagon as a base.

Referring to FIGS. 1 and 2, the hexagonal crystal structure may include an ab-axis direction and a c-axis direction. In this case, an angle formed by the ab-axis direction and the c-axis direction is 90°. For example, the lithium conduction pathway may be formed in the ab-axis direction of the hexagonal crystal structure.

For example, the lithium conduction pathway may mean a pathway through which lithium ions are diffused into the primary particles. The lithium ions may be diffused and move along the lithium conduction pathway.

Figure 3:
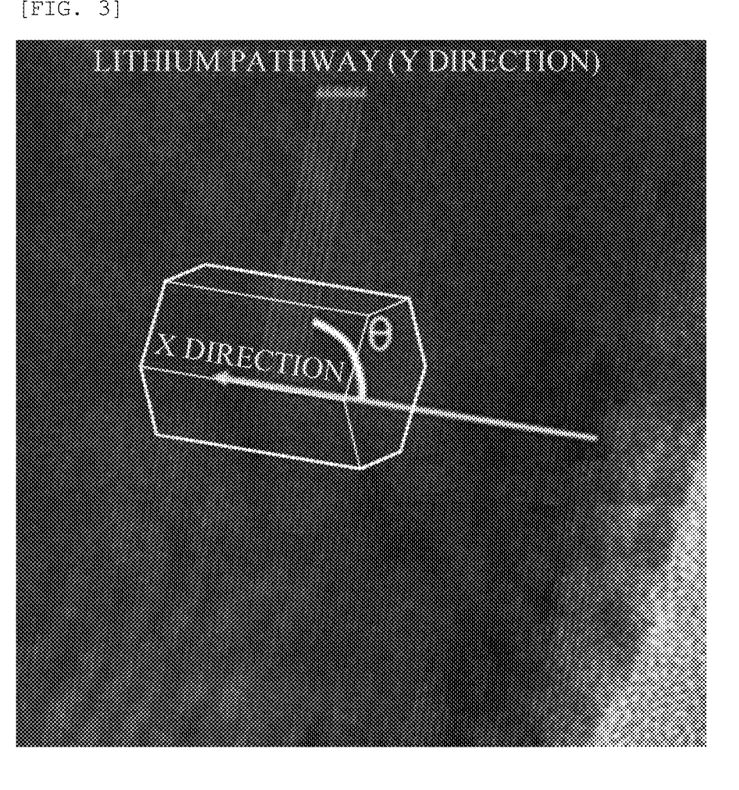
FIG. 3 is a transmission electron microscope (TEM) image of a surface of a lithium composite oxide particle according to an embodiment of the present invention.

FIG. 3 is a transmission electron microscope (TEM) image of a surface of the lithium composite oxide particle according to an embodiment of the present invention.

Referring to FIG. 3, the primary particles located on the surface of the lithium composite oxide particle may include the first particle which has an angle of 45° to 90° formed by a direction (e.g., an X-direction) from a center of the first particle to the center of the lithium composite oxide particle and a direction (e.g., a Y-direction) of the lithium conduction pathway included in the first particle.

For example, an angle θ formed by the direction (e.g., X direction) from the center of the first particle to the center of the lithium composite oxide particle and the direction (e.g., Y direction) of the lithium conduction pathway included in the first particle may mean an acute angle of included angle formed by the X direction and the Y direction.

In one embodiment, a ratio of the number of first particles among the primary particles located on the surface of the lithium composite oxide particles is 20% or more. Preferably, the ratio of the number of first particles among the primary particles located on the surface of the lithium composite oxide particles is 30% or more, and more preferably, 40% or more.

As used herein, the term "primary particles located on the surface of the lithium composite oxide particle" may mean primary particles located at the outermost portion of the lithium composite oxide particle among the primary particles included in the lithium composite oxide particle.

For example, the lithium composite oxide particle may be provided in the form of a secondary particle in which the primary particles are aggregated, and among the primary particles, the primary particles located on the surface of the secondary particle, that is, located at the outermost portion may be defined as "primary particles located on the surface of the lithium composite oxide particle."

In the present invention, the ratio of the number of the first particles among the primary particles located on the surface of the lithium composite oxide particle may be measured through electron back scatter diffraction (EBSD).

The EBSD is a technique for analyzing a crystallographic structure of a material to be analyzed. For example, the EBSD may calculate the crystal structure for an irradiation region, orientation information of crystal lattice, and the like, by using an electron back scatter diffraction pattern (EBSP) generated when irradiating the surface of a crystalline material with an electron beam.

The EBSD pattern may be obtained using, for example, a scanning electron microscope (SEM) or focused ion beam (FIB) equipment including electron beams. For example, when irradiating a specimen (e.g., lithium composite oxide) with the electron beams using the above-described equipment, and tilting the specimen at an angle of 60 to 80° formed with an incident direction of the electron beam, the incident electron beam may be scattered within the specimen to form an EBSD pattern. Various crystallographic maps may be formed by photographing the EBSD pattern with an EBSD camera, and analyzing the same.

For example, through the analysis of the obtained EBSD pattern and crystallographic map, crystallographic information (e.g., directionality, orientation, etc.) on each of the primary particles located on the surface of the lithium composite oxide particle can be confirmed.

For example, in the present invention, the crystallographic information of the primary particles on the surface of the lithium composite oxide may be confirmed through the analysis of the EBSD pattern and the crystallographic map to perform quantitative analysis of the first particles satisfying the above-described conditions. For example, the ratio of the number of the first particles among the entire primary particles on the surface of the lithium composite oxide may be confirmed through the quantitative analysis.

In some embodiments, to obtain more accurate EBSD pattern by measuring, the cross section of the lithium composite oxide may be subjected to pretreatment using equipment such as the FIB or ion milling before measuring the EBSD pattern.

For example, when the ratio of the number of the first particles among the primary particles located on the surface of the lithium composite oxide particle satisfies the above-described range, it is possible to effectively prevent the electrolyte from penetrating into the lithium composite oxide particle. In addition, a specific surface area of the lithium composite oxide particle may be further reduced. Accordingly, an amount of gas generated due to the side reaction of the lithium composite oxide with the electrolyte may be remarkably reduced.

In addition, when increasing a content of nickel included in the primary particles, a length of the hexagonal crystal structure in the c-axis direction may be changed to facilitate a penetration of the electrolyte into the lithium composite oxide particle.

However, for example, when the ratio of the number of the first particles among the primary particles located on the surface of the lithium composite oxide particle satisfies the above-described range, it is possible to effectively prevent the electrolyte from penetrating into the lithium composite oxide particle. Accordingly, the amount of gas generated due to the side reaction of the lithium composite oxide with the electrolyte may be remarkably reduced.

The lithium composite oxide particle may be oxides including lithium and other elements such as transition metals.

In one embodiment, a mole fraction of nickel among elements except for lithium and oxygen of the lithium composite oxide particle may be 0.6 or more. Preferably, the mole fraction of nickel among elements except for lithium and oxygen of the lithium composite oxide particle is 0.8 or more.

In some embodiments, the lithium composite oxide particle may be a nickel-cobalt-based lithium composite oxide particle further including cobalt. For example, the mole fraction of nickel among elements except for lithium and oxygen of the nickel-cobalt-based lithium composite oxide particle may be 0.6 or more, preferably 0.7 or more, and more preferably 0.8 or more.

In some embodiments, the lithium composite oxide particle may be a nickel-cobalt-manganese-based lithium composite oxide particle further including cobalt and manganese. For example, the mole fraction of nickel among metal elements except for lithium and oxygen of the nickel-cobalt-manganese-based lithium composite oxide particle may be 0.6 or more, preferably 0.7 or more, and more preferably 0.8 or more.

In some embodiments, the lithium composite oxide particles may be a nickel-cobalt-aluminum-based lithium composite oxide particle further including cobalt and aluminum. For example, the mole fraction of nickel among metal elements except for lithium and oxygen of the nickel-cobalt-aluminum-based lithium composite oxide particle may be 0.6 or more, and preferably 0.8 or more.

In some embodiments, the lithium composite oxide particle may be a nickel-cobalt-manganese-aluminum-based lithium composite oxide particle further including cobalt, manganese and aluminum. For example, the mole fraction of nickel among metal elements except for lithium and oxygen of the nickel-cobalt-manganese-aluminum-based lithium composite oxide particle may be 0.6 or more, preferably 0.7 or more, and more preferably 0.8 or more.

In some embodiments, the lithium composite oxide particle may further include a coating element or doping element. For example, the coating element or doping element may include Al, Ti, Ba, Zr, Si, B, Mg, P, Sr, W, La, an alloy thereof, or an oxide thereof. These may be used alone or in combination of two or more thereof. The cathode active material particles are passivated by the coating or doping element, thereby stability and life-span against penetration of an external object may be more improved.

In some embodiments, the lithium composite oxide particle may be represented by Formula 1 below.

[Formula 1]

In Formula 1, M is at least one of Al, Zr, Ti, B, Mg, Mn, Ba, Si, W, and Sr, and x, y, a, b, c and y may be in ranges of $0.9 \leq x \leq 1.2$, $1.9 \leq y \leq 2.1$, $0.6 \leq a \leq 1$, $0 \leq c/(a+b) \leq 0.13$ and $0 \leq c \leq 0.11$, respectively.

In some embodiments, in Formula 1, a may be in a range of $0.7 \leq a \leq 1$, and preferably $0.8 \leq a \leq 1$.

In some embodiments, in Formula 1, a, b and c may satisfy ranges of $0.05 \leq b \leq 0.2$, $0.03 \leq c \leq 0.11$, and $0.95 < a+b+c \leq 1.1$, respectively. In this case, the lithium secondary battery may secure a balanced output, capacity, life-span and stability.

In one embodiment, the primary particle may have a mean particle diameter ($D_{50}$) of 0.5 to 1.2 μm. In addition, the secondary particle may have an average particle diameter ($D_{50}$) of 2.5 to 18 μm. In this case, cohesive force and binding force between the primary particles may be enhanced, and high temperature stability may be improved.

For example, the average particle diameter ($D_{50}$) may be defined as a particle diameter based on 50% of a volume particle diameter distribution, and may be measured using a laser diffraction method. For example, the average particle diameter ($D_{50}$) may be calculated using a laser diffraction particle size analyzer (e.g., Microtrac MT 3000).

In one embodiment, the primary particles further include a second particle, and the second particle may have an angle of less than 45° formed by a direction from a center of the second particle to a center of the lithium composite oxide particle and a direction of the lithium conduction pathway included in the second particle.

In one embodiment, the primary particles may include a particle having a triangular shape. For example, the primary particles may include a particle having a triangular shape in which the smallest internal angle is 30° or more and a ratio (shape ratio) of a length of a short side to a length of a long side is 0.5 or more. The long side may mean the longest side (largest side) among three sides of a triangle, and the short side may mean the shortest side (smallest side) among three sides of the triangle. In this case, life-span characteristics and storage characteristics at a high temperature of the lithium secondary battery may be improved.

In some embodiments, the length of the long side of the particle having a triangular shape may be 0.5 μm or more, 1 μm or more, or 2 μm or more.

In some embodiments, the length of the long side of the particle having a triangular shape may be 8 μm or less, 7 μm or less, 6 μm or less, or 5 μm or less.

In some embodiments, at least one or at least two of the internal angles of the particles having the triangular shape may be 30° to 60°.

In some embodiments, the size of the smallest internal angle of the primary particle may be 30° to 60°.

For example, if the internal angle of the particles having the triangular shape is out of the above angle range, the specific surface area of the lithium composite oxide particle may be excessively increased, and a contact area between the primary particles may be decreased. In this case, high-temperature stability of the cathode active material may be reduced.

For example, the triangular shape may be a shape of one surface of the primary particle. For example, the shape of the primary particle may include a triangular plate, a triangular prism, a triangular column, a tetrahedron and the like.

For example, the triangular shape may include not only a shape in which two of three sides are in contact with each other to geometrically form a vertex, but also a shape in which two extended sides of imaginary extended sides extending less than about 20% of each side are in contact with each other to form an imaginary vertex.

For example, one surface of the primary particle having a triangular shape with a large surface area may come into contact with a triangular-shaped surface of another primary particle in a large area. In this case, in the overlapping or laminated structure of the primary particles, an area of an interface where the particles come into contact with each other may be increased. Accordingly, the structural stability of the lithium composite oxide particle provided as secondary particles may be further improved.

In one embodiment, the lithium composite oxide particle may have a strength of 120 Mpa or more. Preferably, the lithium composite oxide particle may have a strength of 150 Mpa or more, and more preferably, 180 Mpa or more. Accordingly, durability and stability of the secondary battery including the lithium composite oxide particle may be further improved.

In one embodiment, the lithium composite oxide particle may be prepared by mixing and reacting composite hydroxide particle with a lithium source. The lithium source may include, for example, lithium salts such as lithium carbonate, lithium nitrate, lithium acetate, lithium oxide, and lithium hydroxide, etc. These may be used alone or in combination of two or more thereof.

In one embodiment, the reaction between the composite hydroxide particle and the lithium source may include heat treatment (a first calcination). The heat treatment may be performed at a temperature in a range of 600° C. to 1000° C., for example.

In one embodiment, the lithium composite oxide particle may have a specific surface area of 0.25 $m^2$/g or less, preferably 0.2 $m^2$/g or less, and more preferably 0.15 $m^2$/g or less. In this case, the lithium secondary battery may have improved high-temperature stability.

In some embodiments, the lithium composite oxide particle may have a specific surface area of 0.06 $m^2$/g or more. In this case, the lithium ions may be more smoothly moved and transferred. In addition, output and capacity of the lithium secondary battery may be more improved.

For example, the lithium composite oxide particle may be formed through post-treatment processes such as coating, additional heat treatment (a second calcination), washing with water, and drying after the first calcination.

For example, lithium impurities (residual lithium, e.g., $Li_2CO_3$, LiOH, etc.) or unreacted water-soluble impurities may be removed through the water washing process. In addition, metal particles may be fixed or crystallinity may be increased through the additional heat treatment (secondary calcination) process. In some embodiments, the secondary calcination may be performed during coating.

In some embodiments, the cathode active material may be formed without performing the water washing process. The cathode active material includes the above-described lithium composite oxide. Due to the low specific surface area of the first particles included in the lithium composite oxide, a content of lithium remaining on the surface may be small. Accordingly, the cathode active material may have a small amount of residual lithium even if the water washing process is not performed.

In some embodiments, the cathode active material may have a content of residual lithium of 4500 ppm or less, preferably 4200 ppm or less, and more preferably 4000 ppm or less, even without performing the water washing process. The residual lithium may mean lithium hydroxide (LiOH) and lithium carbonate ($Li_2CO_3$), and the content of the residual lithium may mean a total content of the lithium hydroxide and lithium carbonate.

Figure 4:
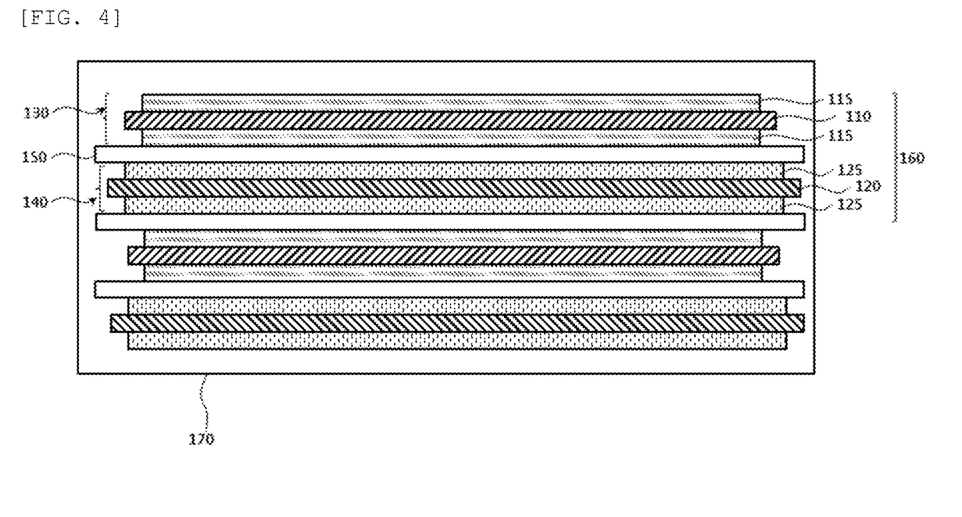
FIG. 4 is a schematic cross-sectional view illustrating a lithium secondary battery according to an exemplary embodiment of the present invention.

FIG. 4 is a schematic cross-sectional view illustrating a lithium secondary battery according to an exemplary embodiment of the present invention.

Referring to FIG. 4, the lithium secondary battery of the present invention may include a cathode 130, an anode 140, and a separation membrane 150 interposed between the cathode and the anode.

The cathode 130 may include a cathode current collector 110 and a cathode active material layer 115 formed by applying the cathode active material to the cathode current collector 110.

The cathode 130 may be prepared by coating the cathode current collector 110 with a cathode slurry, followed by compressing and drying the same. The cathode slurry may be prepared by mixing the cathode active material with a binder, a conductive material and/or a dispersion material in a solvent, followed by stirring the same.

The cathode current collector 110 may include, for example, stainless steel, nickel, aluminum, titanium, copper, or an alloy thereof, and preferably includes aluminum or an aluminum alloy.

The binder may include, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC). For example, a PVDF-based binder may be used as a cathode forming binder. In this case, an amount of the binder for forming the cathode active material layer may be relatively reduced, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 140 may include an anode current collector 120 and an anode active material layer 125 formed by coating the anode current collector 120 with an anode active material.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; silicon or tin may be used. Examples of the amorphous carbon may include hard carbon, cokes, mesocarbon microbead (MCMB) calcined at a temperature of 1500° C. or less, mesophase pitch-based carbon fiber (MPCF), or the like. The crystalline carbon may include graphite-based carbon such as natural graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The anode current collector 120 may include, for example, gold, stainless steel, nickel, aluminum, titanium, copper, or an alloy thereof, and preferably includes copper or a copper alloy.

In some embodiments, a slurry may be prepared by mixing the anode active material with a binder, a conductive material and/or a dispersant in a solvent, followed by stirring the same. The slurry may be coated on the anode current collector 120, followed by compressing and drying to manufacture the anode 140.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

A separation membrane 150 may be interposed between the cathode 130 and the anode 140. The separation membrane 150 may include a porous polymer film made of a polyolefin polymer such as ethylene homopolymer, propylene homopolymer, ethylene/butene copolymer, ethylene/hexene copolymer, ethylene/methacrylate copolymer. The separation membrane may include a nonwoven fabric made of glass fiber having a high melting point, polyethylene terephthalate fiber or the like.

In some embodiments, the anode 140 may have an area and/or volume (e.g., a contact area with the separation membrane 150) larger than those/that of the cathode 130. Thereby, lithium ions generated from the cathode 130 may be smoothly moved to the anode 140 without being precipitated in the middle, for example. Therefore, effects of simultaneously improving the output and stability through a combination with the above-described lithium composite oxide particle or the cathode active material may be more easily implemented.

An electrode cell 160 is defined by the cathode 130, the anode 140 and the separation membrane 150, and a plurality of electrode cells 160 may be laminated to form an electrode assembly. For example, the electrode assembly may be formed by winding, laminating, folding, etc. the separation membrane 150.

The electrode assembly may be housed in a case 170 together with the electrolyte, such that a lithium secondary battery may be defined. For example, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion (X−) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

Electrode tabs may be formed from the cathode current collector 110 and the anode current collector 120, respectively, which belong to each electrode cell, and may extend to one side of the case 170. The electrode tabs may be fused together with the one side of the case 170 to form electrode leads extending or exposed to an outside of the case 170.

The lithium secondary battery may be manufactured, for example, in a cylindrical shape using a can, a square shape, a pouch type or a coin shape.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

Example 1

(1) Preparation of Complex Hydroxide 5 m³ of water was put into a sealed co-precipitation reactor equipped with a stirrer and a concentrator and having a volume of 5.5 m³, and internal dissolved oxygen was removed by bubbling with nitrogen gas for 4 hours or more while maintaining an internal temperature at 63° C.

Further, 15.1 kg of NaOH was put into the reactor, and ammonia aqueous 28% was introduced into the reactor to adjust a concentration of $NH_3$ to 24 g/L. The pH of the reaction solution was 11.9.

2.0 M metal mixed aqueous solution was prepared using $NiSO_4 \cdot 6H_2O$, $CoSO_4 \cdot 7H_2O$, and $MnSO_4 \cdot H_2O$ in a molar ratio of Ni:Co:Mn=0.8:0.1:0.1 while stirring the reaction solution at 175 rpm, and 2.2 M NaOH solution as a pH adjuster and 4.5 M ammonia solution as a chelating agent were continuously introduced into the reactor while bubbling with $N_2$ to perform a co-precipitation reaction.

A filtrate was continuously discharged to an outside of the reactor by the equipped concentration device during the reaction, and the reaction was performed for 157 hours while the formed solid content remained in the reactor.

Since new particulates may be generated while the solid content is increased as the reaction is performed, the initial pH 11.9 and stirring speed of 175 rpm were gradually reduced to pH 10.4 and stirring speed of 141 rpm until the reaction is completed.

The final solid content in the reactor was 69.6% by weight ('wt. %'). A mother liquor after completing the reaction was washed with water sequentially using 2.2 M NaOH solution and pure water, and filtered, followed by drying at 120° C. for 12 hours to obtain 6.5 tons of composite hydroxide $Ni_{0.8}Co_{0.1}Mn_{0.1}(OH)_2$ of Example 1 having an average particle diameter ($D_{50}$) of 12.1 µm, a tap density of 2.17 g/cc, and a BET of 0.89 m²/g.

(2) Preparation of Lithium Composite Oxide 1 kg of the composite hydroxide of the above example and lithium hydroxide ($LiOH \cdot H_2O$) were mixed in a high-speed mixer in a Li/M molar ratio of 1.00, and the mixture was heated to 700° C. at a rate of 2.5° C./min in a calcination furnace (RHK Simulator, Noritake Co., Ltd.), and maintained at 700° C. for 10 hours. Oxygen was continuously passed at a flow rate of 40 mL/min during heating and maintenance. After completion of the calcination, the mixture was naturally cooled to room temperature, followed by grinding and classification to prepare a lithium composite oxide $LiNi_{0.8}Co_{0.1}Mn_{0.1}O_2$.

Example 2

A lithium composite oxide was prepared by performing a reaction according to the same procedures as described in Example 1, except that the calcination temperature was set to be 740° C.

Example 3

A lithium composite oxide was prepared by performing a reaction according to the same procedures as described in Example 1, except that the calcination temperature was set to be 780° C.

Comparative Example 1

5 m³ of water was put into a sealed co-precipitation reactor equipped with a stirrer and a concentrator and having a volume of 5.5 m³, and internal dissolved oxygen was removed by bubbling with nitrogen gas for 4 hours or more while maintaining an internal temperature at 63° C. Further, 12.1 kg of NaOH was put into the reactor, and ammonia aqueous 28% was introduced into the reactor to adjust a concentration of $NH_3$ to 24 g/L. The pH of the reaction solution was 11.6.

2.0 M metal mixed aqueous solution was prepared using $NiSO_4 \cdot 6H_2O$, $CoSO_4 \cdot 7H_2O$, and $MnSO_4 \cdot H_2O$ in a molar ratio of Ni:Co:Mn=0.8:0.1:0.1 while stirring the reaction solution at 175 rpm, and 2.2 M NaOH solution as a pH adjuster and 4.5 M ammonia solution as a chelating agent were continuously introduced into the reactor while bubbling with $N_2$ to perform a co-precipitation reaction.

A filtrate was continuously discharged to an outside of the reactor by the equipped concentration device during the reaction, and the reaction was performed for 77 hours while the formed solid content remained in the reactor.

Since new particulates may be generated while the solid content is increased as the reaction is performed, the initial pH 11.6 and stirring speed of 175 rpm were gradually reduced to pH 10.08 and stirring speed of 135 rpm until the reaction is completed.

The final solid content in the reactor was 37.2 wt. %. A mother liquor after completing the reaction was washed with water sequentially using 2.2 M NaOH solution and pure water, and filtered, followed by drying at 120° C. for 12 hours to obtain 3.3 tons of composite hydroxide $Ni_{0.8}Co_{0.1}Mn_{0.1}(OH)_2$ of Comparative Example 1 having an average particle diameter ($D_{50}$) of 13.7 µm, a tap density of 2.03 g/cc, and a BET of 9.80 m²/g.

A lithium composite oxide $LiNi_{0.8}Co_{0.1}Mn_{0.1}O_2$ was obtained by performing a reaction according to the same procedures as described in Example 1, except that the composite hydroxide of the above comparative example was used.

Experimental Example 1

(1) Analysis of Surface Structure

Surface SEM images of the composite hydroxide particles and lithium composite oxide particles of Example 1 and Comparative Example 1 were obtained using a scanning electron microscope (SEM).

Figure 5:
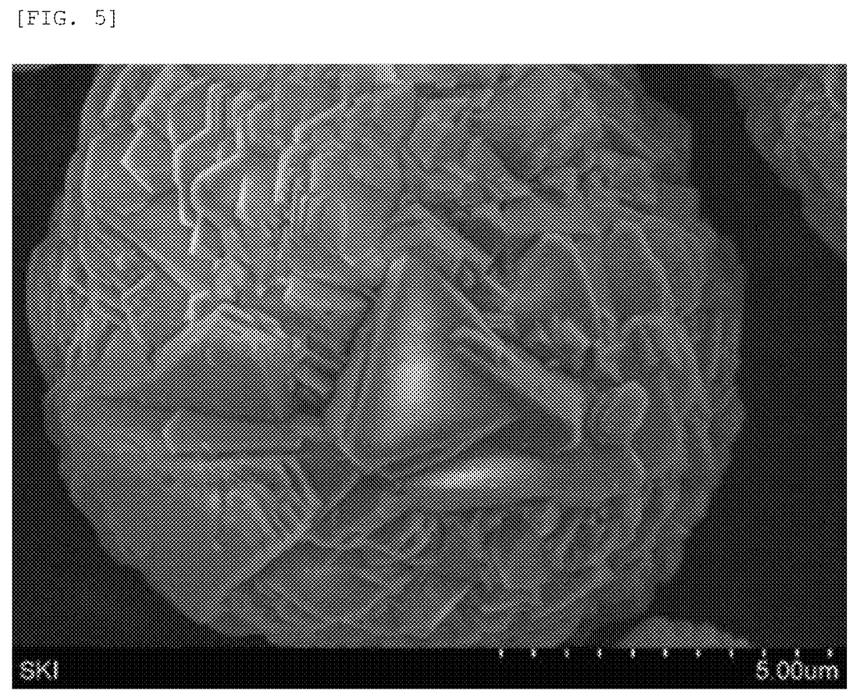
FIGS. 5 to 8 are scanning electron microscope (SEM) images of composite hydroxide particles and lithium composite oxide particles of Example 1 and Comparative Example 1.
Figure 6:
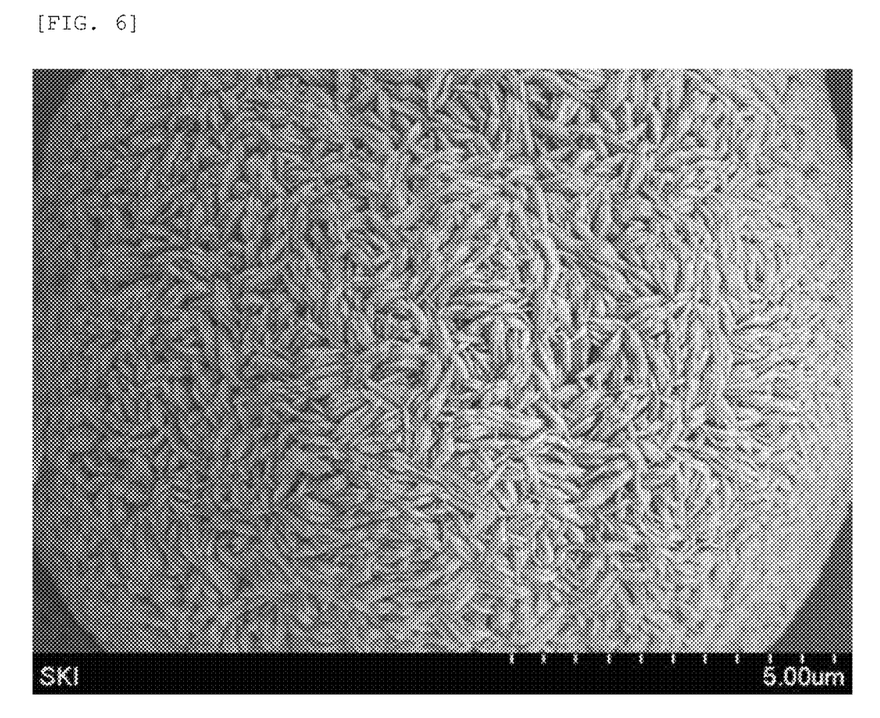

FIG. 5 is an SEM image of the composite hydroxide particle of Example 1, and FIG. 6 is an SEM image of the composite hydroxide particle of Comparative Example 1.

Figure 7:
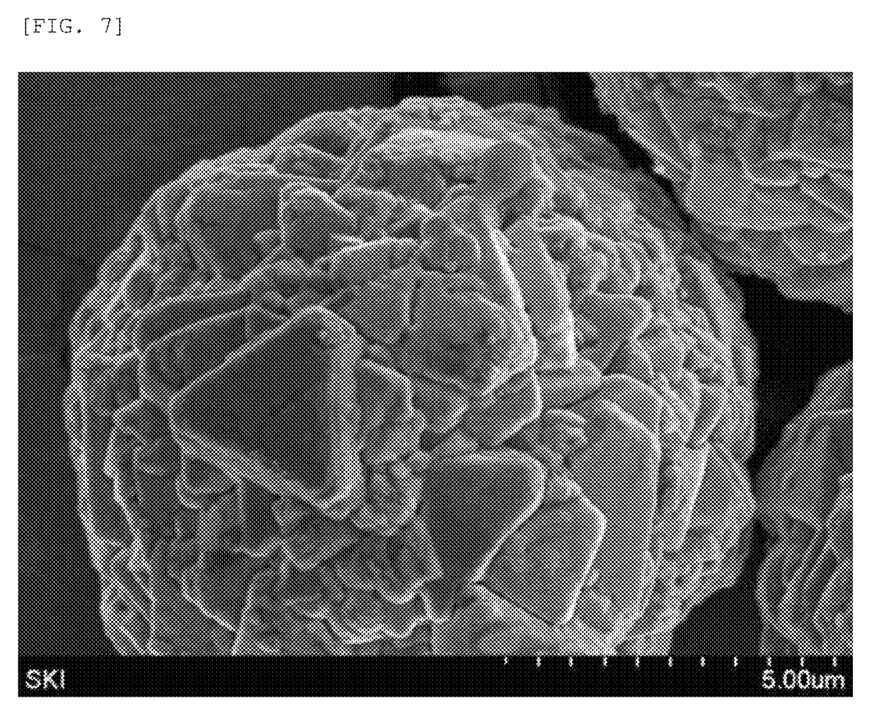
Figure 8:
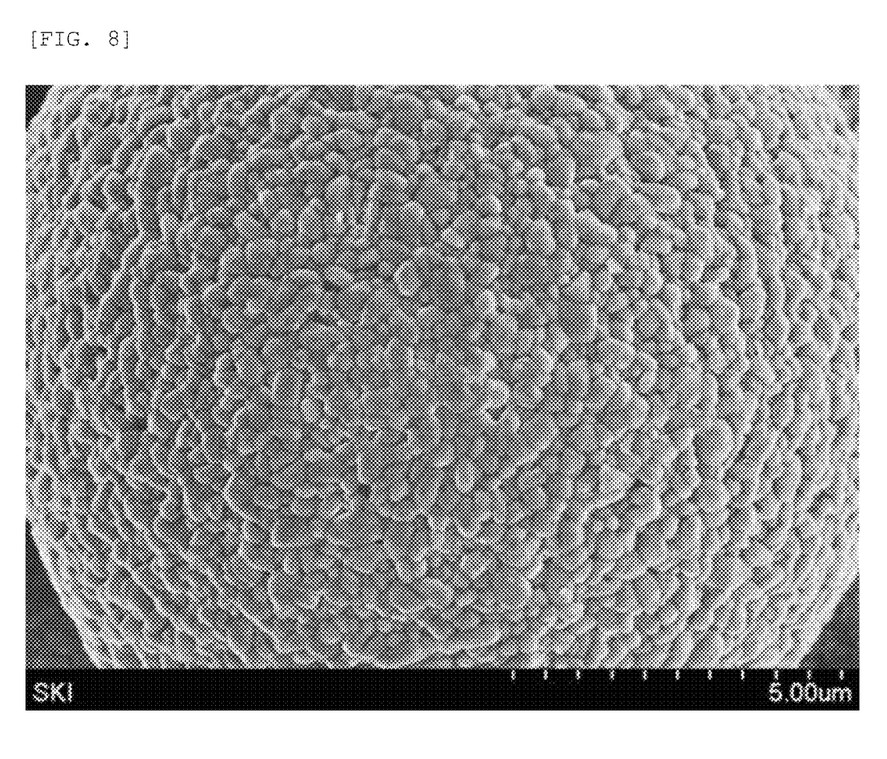

FIG. 7 is an SEM image of the lithium composite oxide particle of Example 1, and FIG. 8 is an SEM image of the lithium composite oxide particle of Comparative Example 1.

Referring to FIGS. 5 and 7, it can be confirmed that triangular-shaped particles are observed on the surface of the composite hydroxide particle of Example 1. In addition, it can be confirmed that triangular-shaped particles are located and remained on the surface of the lithium composite oxide particle of Example 1.

On the other hand, referring to FIGS. 6 and 8, it can be confirmed that needle-shaped particles are observed on the surface of the composite hydroxide particle of Comparative Example 1. In addition, it can be confirmed that the lithium composite oxide particle of Comparative Example 1 have a relatively larger specific surface area than that of the lithium composite oxide particle of Example 1.

(2) Evaluation of Electron Back Scatter Diffraction (EBSD); Ratio of First Particles Through electron back scatter diffraction (EBSD) analysis, a ratio of the number of first particles among the primary particles located on the surface of the lithium composite oxide particles of the examples and Comparative Example 1 (the number of first particles located on the surface of the lithium composite oxide particle/the number of total primary particles located on the surface of the lithium composite oxide particle×100%) was calculated, and results thereof are shown in Table 1 below.

When a direction from the center of the primary particle to the center of the lithium composite oxide particle is determined as an X direction, and a direction of the lithium conduction pathway included in the primary particle is determined as a Y direction, primary particles having an angle of 45° to 90° formed by the X direction and the Y direction was defined as the first particle.

Before measuring an EBSD pattern, cross-sectional pretreatment was performed on the lithium composite oxide particles of the examples and Comparative Example 1. The cross-section pretreatment was performed through Hitachi's Ion milling system IM4000PLUS.

EBSD pattern measurement and analysis were performed using an FEI HELIOS Plasma FIB Microscope (under condition of 20 kV accelerating voltage) and EDAX EBSD.

Figure 9:
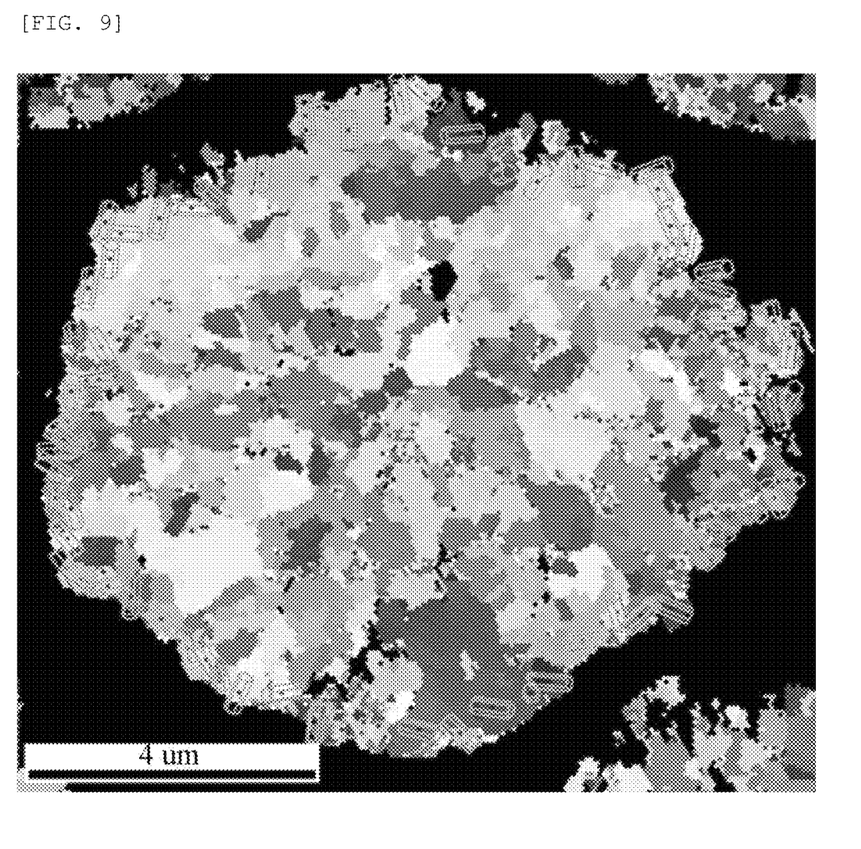
FIGS. 9 and 10 are images illustrating results of electron back scatter diffraction (EBSD) analysis performed on the lithium composite oxide particles of Example 1 and Comparative Example 1.
Figure 10:
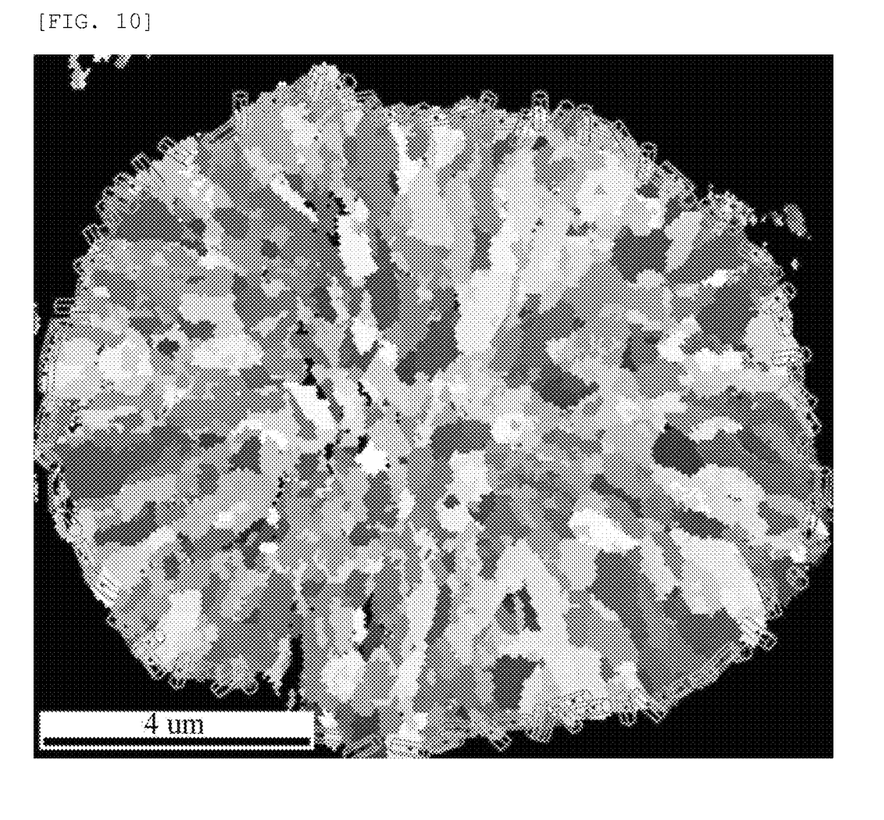

FIG. 9 is an image illustrating results of EBSD analysis for the lithium composite oxide particle of Example 1, and FIG. 10 is an image illustrating results of EBSD analysis for the lithium composite oxide particle of Comparative Example 1.

(3) Analysis of Specific Surface Area (BET)

BETs of the lithium composite oxide particles of the examples and Comparative Example 1 were measured using a BET measuring instrument (ASAP2420, Micrometrics Co.), according to a gas adsorption/desorption method, and results thereof are shown in Table 1.

(4) Analysis of Residual Lithium Content

Contents of residual lithium (LiOH and $Li_2CO_3$) of the lithium composite oxide particles of the examples and Comparative Example 1 were measured according to the following method, without performing the water washing process, and results thereof are shown in Table 1.

2.5 g of lithium composite oxide particles of the examples and Comparative Example 1 were quantified in a 250 mL flask and 100 g of deionized water was added thereto, then a magnetic bar was put into the flask, followed by stirring the mixture at a speed of 300 rpm for 10 minutes.

Thereafter, 50 g of the solution was sampled after filtering using a flask at reduced pressure.

The sampled solution was put into a container of automatic titrator and automatically titrated with 0.1 N HCl referring to the Wader's method to measure LiOH and $Li_2CO_3$ values in the solution.

(5) Evaluation Particle Strength

Three particles were randomly selected from among the lithium composite oxide particles of the examples and Comparative Example 1 to measure the particle strength, and then average values thereof are shown in Table 1.

The particle strength was measured using a micro compression tester (MCT-W500-E, Simadzu Co.).

TABLE 1

|  | BET ($m^2/g$) | Content of residual lithium (ppm) | | Evaluated EBSD (%) | Particle strength (MPa) |
| --- | --- | --- | --- | --- | --- |
|  |  | LiOH | $Li_2CO_3$ |  |  |
| Example 1 | 0.21 | 2600 | 1690 | 45 | 183.0 |
| Example 2 | 0.17 | 2260 | 1840 | 47 | 187.6 |
| Example 3 | 0.14 | 2250 | 1510 | 48 | 191.8 |
| Comparative Example 1 | 0.40 | 4420 | 5300 | 19 | 106.7 |

Referring to Table 1, it can be confirmed that the lithium composite oxides of the examples have relatively smaller BET values than those of the lithium composite oxide of Comparative Example 1, and that the contents of residual lithium are significantly lower. In addition, it can also be confirmed that the values of the particle strength are remarkably high.

DESCRIPTION OF REFERENCE NUMERALS

110: Cathode current collector
115: Cathode active material layer
120: Anode current collector
125: Anode active material layer
130: Cathode
140: Anode
150: Separation membrane
160: Electrode cell
170: Case

What is claimed is:

1. A cathode active material comprising:
   a lithium composite oxide particle having the form of a secondary particle in which a plurality of primary particles are aggregated, wherein the plurality of primary particles respectively include a lithium conduction pathway through which lithium ions are diffused,
   wherein the plurality of primary particles include a plurality of first particles, and each of the plurality of first particles has a hexagonal crystal structure and an angle of 45° to 90° formed by a direction from a center of each of the plurality of first particles to a center of the lithium composite oxide particle and a direction of the lithium conduction pathway included in the plurality of first particles,
   wherein a ratio of the number of the plurality of first particles among the plurality of primary particles located on a surface of the lithium composite oxide particle is 20% or more,
   wherein the plurality of primary particles include a plurality of second particles, and each of the plurality of second particles has a hexagonal crystal structure and an angle of less than 45° formed by a direction from a center of each of the plurality of second particles to a center of the lithium composite oxide particle and a direction of the lithium conduction pathway included in the plurality of second particles and
   wherein the plurality of primary particles only include the plurality of first particles and the plurality of second particles,
   wherein the lithium conduction pathway is formed in an ab-axis direction of the hexagonal crystal structure.

2. The cathode active material according to claim 1, wherein at least one of the plurality of first particles has a triangular shape.

3. The cathode active material according to claim 1, wherein the lithium composite oxide particle has a specific surface area of 0.25 m2/g or less.

4. The cathode active material according to claim 1, wherein a mole fraction of nickel among elements except for lithium and oxygen of the lithium composite oxide particle is 0.6 or more.

5. The cathode active material according to claim 1, wherein the lithium composite oxide particle has a strength of 120 Mpa or more.

6. A lithium secondary battery comprising:
a cathode comprising the cathode active material according to claim 1,
an anode, and
a separation membrane interposed between the cathode and the anode.

\* \* \* \* \*